Oct. 23, 1962   L. D. YOKANA   3,059,276
EXTRUSION APPARATUS
Filed Dec. 5, 1960   2 Sheets-Sheet 1

INVENTOR.
LUCIEN D. YOKANA
BY
Pennie, Edmonds, Morton, Barrows & Taylor
ATTORNEYS

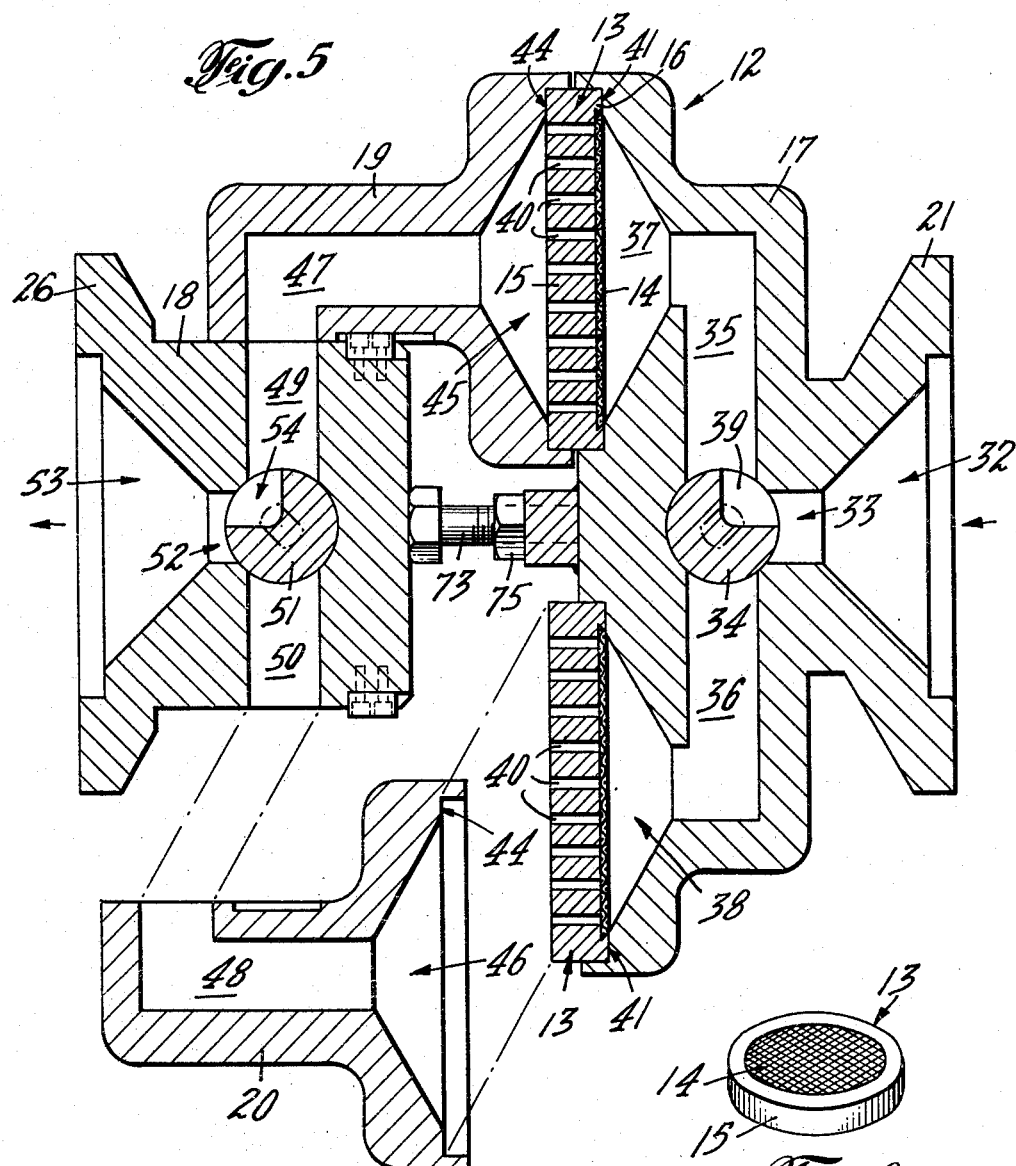

United States Patent Office 3,059,276
Patented Oct. 23, 1962

3,059,276
EXTRUSION APPARATUS
Lucien D. Yokana, Princeton, N.J., assignor to Sterling Extruder Corporation, Linden, N.J., a corporation of New Jersey
Filed Dec. 5, 1960, Ser. No. 73,688
7 Claims. (Cl. 18—12)

This invention relates to extrusion apparatus employed in the manufacture of extruded or molded plastic products. Such apparatus delivers the flowable plastic material to the molding apparatus under suitable pressure to cause it to flow into the recesses and chambers of the die or mold.

In the manufacture of extruded or molded plastic articles the plastic material may have become contaminated to a greater or less extent with foreign materials of various kinds. It is, therefore, important to separate such foreign material from the plastic material before it enters the molding apparatus. This is done conventionally by means of a combined screen and breaker plate, the plastic material flowing first through the screen and then through the apertures of the breaker plate. The combined screen and breaker plate are connected between the extruder barrel and the molding apparatus so that the plastic flows through the screen and breaker plate on its way to the die. Both the screen and the breaker plate serve to provide the required back pressure in the extruder barrel.

Manufacturers of extruded or molded plastic articles or products customarily operate their machines on a twenty-four hour daily basis, that is, without shut-down, except when changing over for the purpose of producing a different product. The aim is continuous production with the object of keeping the unit cost of the molded articles as low as possible, and, of course, any shut-down tends to increase the cost. However, the presence of the contaminating materials compels shut-down periodically to change the screen. As mentioned, the screen is usually attached to the breaker plate so that the two can be removed as a unit and a new unit inserted in place of the old as conveniently as possible.

Various attempts have been made to provide for the change of such combined screen and breaker plate units with the shortest possible shut-down of the equipment. None of these prior arrangements have been satisfactory because of a tendency to permit excessive leakage of the molded plastic, or otherwise, and it is the aim of the present invention to provide an extrusion apparatus by means of which the combined screen and breaker plate units can be changed while the extrusion apparatus continues in operation, or, in other words, without shut-down.

In accordance with the invention an extruder cylinder, with a conventional propelling screw rotating therein and suitably power driven so as to force the plastic material toward one end of the cylinder, has a screen-changing assembly comprising an intake member mounted on the outlet end of the extruder, a discharge member connected to the molding apparatus, and two removable members or "legs" for positioning two combined screen and breaker units in suitable cavities provided within the intake member.

The intake member has a recess at its entrance end for receiving the plastic material from the extruder cylinder, together with passages connecting this recess with each of the cavities, and a valve interconnecting the entrance recess with these passages. By the valve arrangement the recess may be selectively connected with one of the cavities and disconnected from the other, and vice versa. The discharge member also contains two passages and a discharge space from which the plastic passes to the molding apparatus, together with a valve interconnecting these passages and the discharge space so that one of the passages may be selectively connected with the discharge space, the other passage being disconnected therefrom, and vice versa. It will be understood that each of the positioning members has a passageway therethrough so as to connect the screen and breaker plate unit with which it is associated to one of the passages in the discharge member.

Finally, the two removable screen unit positioning members are provided with releasable clamping devices by which each of these positioning members is clamped to the intake member and to the discharge member. The arrangement is such that each of the combined screen and breaker plate units is held by clamping action between the periphery of one of the cavities in the intake member and the periphery of the cooperating portion of one of the removable positioning members. Spacing devices are provided for maintaining the desired separation between the end of the extruder barrel and the holding apparatus, and these devices are adjustable.

By reason of the construction above described, when one of the units becomes fouled, the two valves can be set, either by hand or automatically, to cause the flow of the plastic material from the extruder cylinder through the other combined screen and breaker plate unit and thence to the molding apparatus, the fouled unit being disconnected so that no plastic flows through it. The clamping devices which hold the positioning member for this screen and breaker plate unit may be released and this positioning member removed, whereupon the screen and breaker plate unit which has been in use can be removed from its cavity in the intake member, and replaced by a fresh, clean unit. The positioning member is then returned to its clamping position with respect to the new unit, and the clamping devices are again applied and the parts again clamped in place so that whenever it is desired to do so the valves can be changed to cause the plastic to flow through the new screen and breaker plate unit. The unit on the opposite side of the apparatus can be replaced at will by a similar procedure.

The invention will be further understood by referring to the accompanying drawings and the detailed description following:

FIG. 5 is a larger scale view in horizontal section taken through the screen changer assembly on line 5—5 of FIG. 2, with parts omitted, and with one of the positioning members or "legs" shown partially displaced; and FIG. 6 is a perspective view of a combined screen or filter and breaker plate unit.

Figure 1:
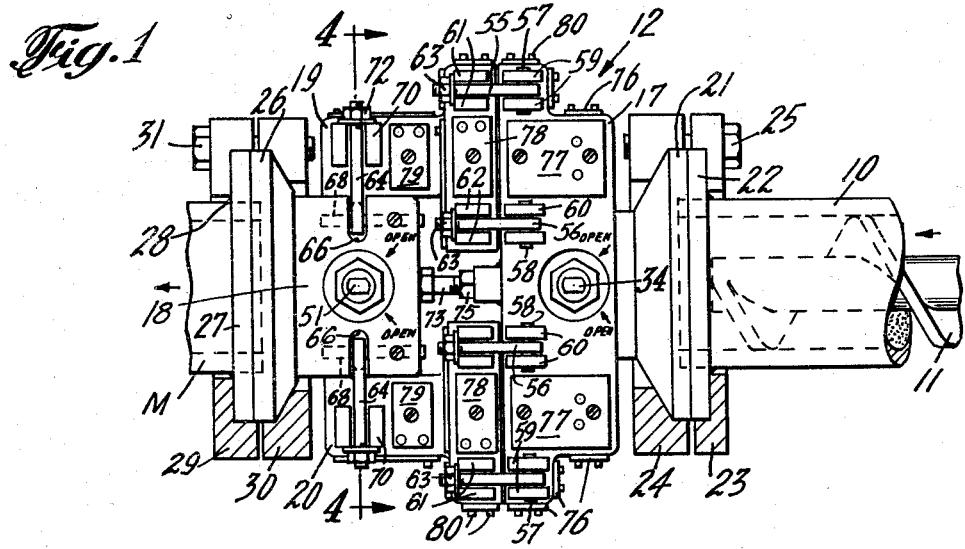
FIG. 1 is a plan view of a portion of an extruder cylinder and screw therein having a screen changer removably mounted upon its outlet end and the discharge end of this assembly being connected to a molding apparatus.
Figure 2:
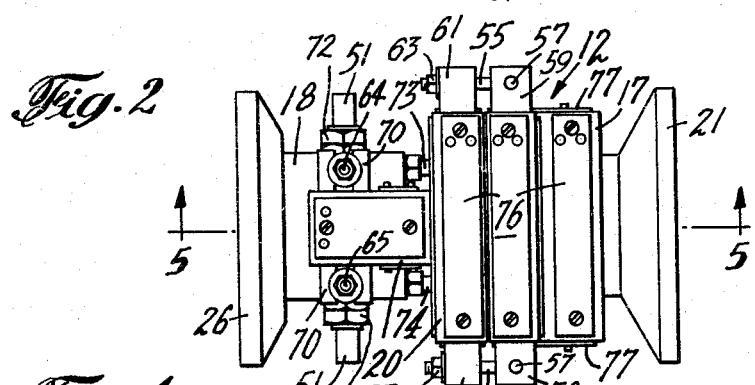
FIG. 2 is a side elevation of the screen changer assembly removed from the other parts of the apparatus.

Referring first to FIG. 1 of the drawings, a portion of the outlet end of an extruder cylinder or barrel is shown at 10, the cylinder being provided with the usual propelling screw 11 which is driven by any suitable power source (not shown). At the left is the screen changer assembly which is indicated generally by reference numeral 12.

Within assembly 12 there are two screen or filter units which are used alternately as will be presently described, and the term screen or filter unit will be understood to include the combined screen and breaker plate unit 13 shown in FIGS. 5 and 6 which consists of a wire mesh 14 fixed to a breaker plate or disc 15, as well as a breaker plate without a screen. Conventionally screen 14 is fixed to breaker plate 15 by placing the screen in a shallow recess in the front surface of the breaker plate, the inner edge of the rim surrounding such recess being reversely chamfered or bevelled, as indicated at 16 in FIG. 5.

The screen changer assembly 12 comprises an intake member 17, mounted on the end of the extruder cylinder 10, a discharge member 18 mounted on a molding apparatus M, and left and right screen unit positioning members 19 and 20. Intake member 17 is provided with a connecting flange 21 by means of which it is mounted on the end of extruder cylinder 10, the cylinder having a flange 22 welded thereto for this purpose. The two flanges 21 and 22 are secured together in a conventional manner by means of rings 23 and 24, usually of sectional construction to facilitate assembly, and held together by means of a series of bolts or screws 25 which are threadedly engaged by the inner ring 24.

At the left end of the device, as shown in FIG. 1, the discharge member 18 is secured to molding apparatus M in a similar manner. That is to say, a flange 26 on the left end of member 18 is secured to a flange 27 on the molding apparatus and welded thereto as indicated at 28. Cooperating rings 29 and 30 may be used, similar to rings 23 and 24, and a series of bolts or screws 31.

Referring now to FIG. 5, intake member 17 has an inlet or entrance recess 32 of conical shape and terminating inwardly in a short passage 33 which leads to a valve opening in which is located a valve member 34. Leading from valve 34 in opposite directions are a left-hand passage 35 and a right-hand passage 36 which lead respectively to two cavities 37 and 38. Valve member 34 is a plug-type valve similar to the one illustrated in FIG. 4, and is provided with a right angled opening 39 so that with the valve in the position shown in FIG. 5, plastic may flow through passages 33 and 35 to cavity 37, and at the same time passage 36 is cut off from passage 33 so that flow to cavity 38 is cut off.

The breaker plate 15 comprises a solid disc of circular form and having numerous small openings 40 therein for the purpose of breaking up the solid stream of plastic into numerous small streams. The opposite faces of the plate are parallel and smooth and one face of the screen and breaker plate unit 13 in each of cavities 37 and 38 is positioned against a flat annular surface 41 which is provided round the peripheries of these recesses so as to make fluid-tight joints with the screen and breaker plate units.

The removable positioning members 19 and 20 are on the opposite sides of the respective screen and breaker plate units 13, that is opposite the cavities 37 and 38. Each of these positioning members clamps or holds the screen and breaker plate unit associated therewith against the sealing surface 41 of one or the other of the cavities 37 or 38. For this purpose each of the positioning members 19 and 20 is provided with an annular surface 44 which is somewhat similar to surface 41 and which bears against the marginal edge of one of the screen units.

Also, within positioning members 19 and 20 there are conical recesses 45 and 46 similar to recesses 37 and 38 which connect with right angled passageways 47 and 48 respectively.

The discharge member 18 has two cross passages 49 and 50 which are aligned with the discharge ends of passageways 47 and 48 respectively. These passages 49 and 50 converge upon a second valve member 51 by which they may be selectively connected to a short passage 52 which opens into a discharge space 53. The valve opening 54 of valve 51 is of the same construction as valve opening 39 in valve member 34 so that when passage 49 is connected to discharge space 53, the passage 50 is disconnected therefrom, and vice-versa.

By this arrangement the flow of plastic may be directed through either the right hand or the left hand screen or filter unit and cut off from the other unit. As shown in FIG. 5, for example, the flow is through the right-hand cavity 37 and its strainer and breaker plate unit 13, and flow through the left-hand cavity 38 and its unit is cut off.

By the construction of the apparatus the positioning member 20, for example, can be removed as indicated diagrammatically in FIG. 5, and the strainer and breaker plate unit 13 of cavity 38 which may have become fouled, can be removed and replaced with a fresh unit. Then the positioning member 20 is returned to its original position, as shown in FIGS. 1 to 4, and flow of the plastic can be directed through this side of this device whenever it is desired to do so.

Referring now to FIGS. 1–4, each of the positioning members 19 and 20 is held in position by means of a number of swinging eye bolts. As the construction is the same for the left-hand as well as for the right-hand sides of the screen changer, the arrangement of these eye bolts for only the right side, that is, for number 19, will be described. Two eye bolts 55 are provided on the top of the screen changer assembly 12 and two eye bolts 56 on the bottom for each positioning member. The eyes of these bolts are pivoted on pins 57 and 58 which are secured in apertures in pairs of spaced lugs 59 and 60, these lugs being formed integrally with the intake member 17. When bolts 55 and 56 are swung parallel to the sides of the positioning member 19 they are received between pairs of spaced lugs 61 and 62 respectively. Thereupon nuts 63 with washers beneath are screwed onto ends of the bolts and tightened. This causes positioning member 19 to be drawn forcibly towards intake member 17, thus causing annular surfaces 41 and 44 to clamp the opposite sides of the combined screen and breaker plate 13 in cavity 37.

Figure 4:
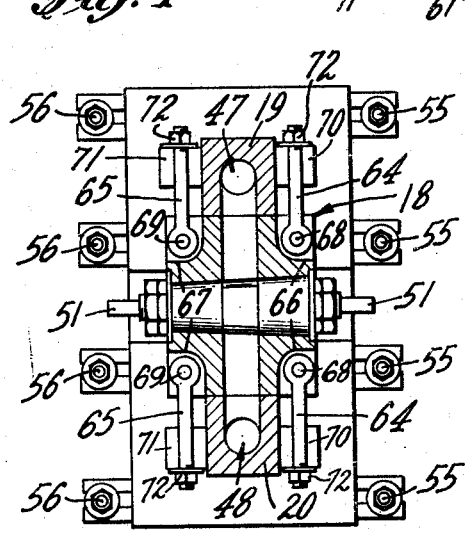
FIG. 4 is a view in vertical section taken on line 4—4 of FIG. 1 looking in the direction of the arrows.
Figure 3:
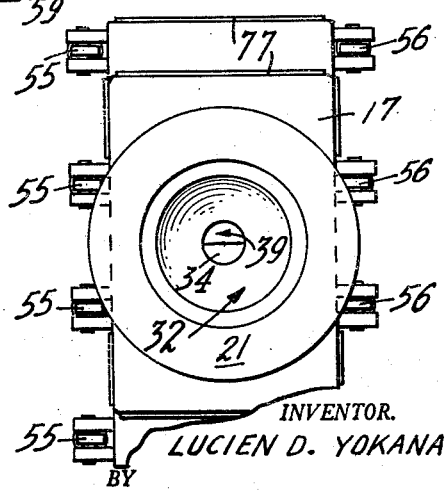
FIG. 3 is a view of the assembly of FIG. 2 in end elevation looking from the right.

The opposite end portions of the positioning units 19 and 20 are clamped against the opposite vertical sides of discharge element 18 in a similar way, but the direction of clamping is at right angles to the direction of clamping described above. That is to say, the plane of the junction surfaces between the positioning members 19 and 20 and discharge member 18 are at right angles to the plane of the screen units 13. In this instance a single swinging eye bolt 64 is arranged on the top of positioning unit 19, and a single eye bolt 65 on the bottom. The eye portions of these bolts are received within central recesses 66 and 67 respectively (FIG. 1) which are arranged at the respective upper and lower right-hand corners of the discharge member 18 (FIG. 4). Pins 68 and 69 are fixed in apertures in member 18 and form the pivots for the swinging eye bolts 64 and 65.

As shown these two eye bolts are both in clamping position, bolt 64 being received between a pair of lugs 70 which are similar to the lugs previously described, and bolt 65 being received between a similar pair of lugs 71. Nuts 72, with washers beneath them, have been applied to each of the bolts 64 and 65 thereby drawing the contacting or junction surfaces of positioning member 19 and the vertical wall of discharge member 18 into sealing contact with one another. These junction surfaces being plane slight variation in thickness of the screen units is permissible.

The clamping arrangements for the left-hand positioning unit 20 are identical with those described above and corresponding reference numerals have been used.

It will be understood that when the two positioning members 19 and 20 are clamped in place, not only are the two combined screen and breaker plate units 13 clamped in position in their respective cavities 37 and 38, but also the passageways 47 and 48 through the respective positioning members 19 and 20 are joined respectively to passages 49 and 50 within discharge member 18.

When one of the positioning members, either member 19 or member 20, is removed as above-described in order to change screen and breaker plate unit 13, this tends to place a considerable stress on the positioning unit which remains in position, particularly if the alignment of the extruder cylinder and the molding apparatus is not precise. In order to alleviate this condition a pair of adjustable spacers in the form of hex-headed screws 73 and 74 (FIG. 2) are provided. These screws are threaded into a portion of intake member 17 on the vertical center line thereof and the heads are brought into engagement with the rear vertical surface of discharge member 18. These screws are fixed in adjusted position in any suitable way as, for example, by means of lock nuts, one of which is shown at 75 in FIGS. 1 and 5.

Valve members 34 and 51 are slabbed at each end as shown especially in FIGS. 1 and 4 in order to receive a hand wrench. The ends of valve 34 are recessed within the intake member 17 whereas the ends of valve 51 project above and below discharge member 18.

The two "open" positions of each valve are indicated by small arrows at right angles to each other in each of FIGS. 1 and 5. It will be understood that automatic operation of these valves from one position to the other, after the lapse of a predetermined time, may be provided for, if desired.

In order to facilitate the maintenance of the plastic material in suitably flowable condition electric heating devices may be applied to screen changer 12. The dimensions and shape of such devices depend upon the exposed surface of the screen changer available to receive the heaters. Thus, in FIGURE 2 slender, rectangular heaters 76 are secured to the opposite sides of intake member 17 and the enlarged rectangular head portion of each of the positioning units 19 and 20. Smaller and different dimensioned heating units indicated by numerals 77, 78 and 79 may be applied to other parts of the intake unit and the positioning members. Each of these heating units is fastened in place by suitable screws and each is provided with a pair of terminals such as shown at 80 in FIGURE 1 for connection to an electrical supply circuit.

The operation of the screen changer has been sufficiently indicated previously. By this invention the changing of a used or fouled screen or filter unit can be effected without shut-down of the extruder and plastic molding apparatus, and the substitution of a fresh screen or filter unit can be accomplished in a few minutes' time.

Inasmuch as changes can be made in the screen changer as described herein, it will be understood that the scope of the invention is set forth in the appended claims.

I claim:

1. In apparatus for molding plastic material, an extruder cylinder, a screw rotating therein to force plastic toward the end of the cylinder, and a screen changer assembly mounted upon the outlet end of the cylinder comprising intake means having therein two separate cavities each arranged to receive a screen unit, said means having an entrance recess for receiving the plastic, passages connecting said recess with each of said cavities and a valve interconnecting said recess and said passages for selectively connecting said entrance recess with one of said cavities and disconnecting it from the other, said assembly also including discharge means connected to a molding apparatus and having two passages therein and a discharge space, a valve interconnecting said passages and said space for selectively connecting one of said passage with said discharge space and disconnecting the other passage therefrom, and removable members for positioning said screen units in said cavities for making liquid-tight joints with the opposite margins of the units, each of said positioning members having a passageway connecting its screen unit with one of the passages of said discharge means, and releasable means for securing each of the positioning members to the intake and discharge means.

2. An extrusion apparatus as set forth in claim 1 wherein the screen unit is a combined screen and breaker plate device.

3. In apparatus for molding plastic material, an extruder cylinder, a screw rotating therein to force plastic toward the end of the cylinder, and a screen changer assembly mounted upon the outlet end of the cylinder comprising an intake member having therein two separate cavities, each with an annular sealing surface surrounding it, a disc-like screen unit disposed in marginal contact with the sealing surface of each of said cavities, said member having an entrance recess for receiving the plastic, passages connecting said recess with each of said cavities and a valve interconnecting said recess and said passages for selectively connecting said entrance recess with one of said cavities and disconnecting it from the other, said assembly also including a discharge member connected to a molding apparatus, said member having two passages therein and a discharge space, a valve interconnecting said passages and said space for selectively connecting one of said passages with said discharge space and disconnecting the other passage therefrom, and removable members for positioning said screen units in said cavities, each of said positioning members having an annular sealing surface to engage the opposite marginal surface of one of said screen units and having a passageway connecting its screen unit with one of the pasages in said discharge member, releasable devices for drawing each of said positioning members towards said intake member so as to clamp said screen units between them, and other releasable devices for securing said positioning members to said discharge member.

4. An extrusion apparatus as set forth in claim 3 wherein the plane of junction between each of said positioning members and said discharge member is disposed at right angles to the plane of the said screen units.

5. An extrusion apparatus as set forth in claim 1 wherein adjustable spacing devices are arranged between the opposing inner surfaces of the intake and discharge members so as to maintain these parts in precise spaced relationship during the period that one of the positioning members is removed.

6. In an apparatus for molding plastic material, an extruder cylinder, a screw rotating in said cylinder to force plastic material towards the discharge end of the cylinder, a screen changer having an inlet positioned to receive plastic material from the discharge end of said extruder cylinder and an outlet adapted to communicate with a molding apparatus, a pair of independent conduits for conveying material from said inlet to said outlet, a valve for selectively controlling the flow of plastic material to said pair of conduits, a valve for selectively controlling the flow of material from said pair of conduits to said outlet, a screen unit in each of said conduits, each of said conduits including a complete conduit section located between said screen and one of said valves and removable to give access to the respective screen unit for removal and changing thereof.

7. A screen changer for use in molding apparatus having an inlet positioned to receive plastic material to be molded and an outlet for the discharge of material to a molding apparatus, a pair of independent conduits for conveying material from said inlet to said outlet, a valve for selectively controlling the flow of plastic material to said pair of conduits, a valve for selectively controlling the flow of material from said pair of conduits to said outlet, a screen unit in each of said conduits, each of said conduits including a complete conduit section located between said screen and one of said valves and removable to give access to the respective screen unit for removal and changing thereof.

References Cited in the file of this patent

UNITED STATES PATENTS

| | | |
|---|---|---|
| 642,813 | Cowen | Feb. 6, 1900 |
| 1,759,927 | Zwicky | May 27, 1930 |
| 2,184,177 | Burrell | Dec. 19, 1939 |
| 2,838,084 | Samler | June 10, 1958 |
| 3,007,199 | Curtis | Nov. 7, 1961 |